(12) United States Patent
Yang (10) Patent No.: US 7,004,231 B2
(45) Date of Patent: Feb. 28, 2006

(54) NATURAL THERMO CARRIER FLUID EXCHANGE SYSTEM FOR HEAT RECLAIM

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 249 days.

(21) Appl. No.: 10/407,130

(22) Filed: Apr. 7, 2003

(65) Prior Publication Data

US 2004/0194909 A1  Oct. 7, 2004

(51) Int. Cl.
*F28D 20/00* (2006.01)
(52) U.S. Cl. ............ 165/11.1; 165/45; 165/48.1; 165/54; 62/260
(58) Field of Classification Search ........... 165/11.1, 165/18, 45, 54, 48.1; 62/260
See application file for complete search history.

(56) References Cited

U.S. PATENT DOCUMENTS

| | | | | |
|---|---|---|---|---|
| 2,007,406 A | * | 7/1935 | Miller | 165/45 |
| 2,178,176 A | * | 10/1939 | Lamm | 165/45 |
| 4,373,573 A | * | 2/1983 | Madwed | 165/45 |
| 4,952,283 A | * | 8/1990 | Besik | 165/54 |
| 5,706,888 A | * | 1/1998 | Ambs et al. | 165/45 |
| 6,167,715 B1 | * | 1/2001 | Hebert | 62/260 |
| 6,484,794 B1 | * | 11/2002 | Schulak et al. | 165/45 |
| 6,575,228 B1 | * | 6/2003 | Ragland et al. | 165/54 |
| 2002/0040775 A1 | * | 4/2002 | Bassilakis | 165/54 |
| 2004/0000159 A1 | * | 1/2004 | Xu | 62/260 |

* cited by examiner

*Primary Examiner*—Teresa J. Walberg
(74) *Attorney, Agent, or Firm*—Rabin & Berdo, P.C.

(57) ABSTRACT

A system including active heat balance device and fluid transmission pipelines provided inside a solid, liquid, or gaseous thermo carrier with comparatively reliable thermo reservation capacity in the nature to reclaim heat from the fluid flowing in opposite direction by releasing heat to the fluid of relatively lower temperature flowing through the pipelines, or to absorb the heat to cool the fluid of relatively higher temperature flowing through the pipelines in the opposite direction.

15 Claims, 5 Drawing Sheets

NATURAL THERMO CARRIER FLUID EXCHANGE SYSTEM FOR HEAT RECLAIM

BACKGROUND OF THE INVENTION (a) Field of the Invention

The present invention is related to a fluid exchange system of a natural thermo carrier for heat reclaim, and more particularly, to one that provides an active heat balance device and a fluid transmission pipeline in a solid, liquid, or gaseous state of a natural thermo carrier, i.e. in stratum, geodetic surface, a pond, a lake, a river, a desert, an iceberg, or the ocean of the nature, for the active heat balance device to directly or via an additional heat balance relay to release heat to heat the fluid in transit of comparatively lower temperature, or to absorb the heat to cool the fluid of comparatively higher temperature in transit in the opposite direction so to achieve heat reclaim purpose on the fluid in transit in different direction.

(b) Description of the Prior Art

The present invention relates to an improvement of the U.S. patent application Ser. No. 192,620 filed by this same inventor.

SUMMARY OF THE INVENTION

The primary purpose of the present invention is to provide a system including active heat balance device and fluid transmission pipelines provided inside a solid, liquid, or gaseous thermo carrier with comparatively reliable thermo reservation capacity in the nature to reclaim heat from the fluid flowing in opposite direction by releasing heat to the fluid of relatively lower temperature flowing through the pipelines, or to absorb the heat to cool the fluid of relatively higher temperature flowing through the pipelines in the opposite direction.

DETAILED DESCRIPTION OF THE PREFERRED EMBODIMENTS

A fluid exchange system of a natural thermo carrier for heat reclaim is to provide an active heat balance device that gives good heat conduction property in a comparatively stable solid or liquid state thermo carrier in the nature including stratum, geodetic surface, pond, lake or river, or the active heat balance device is forthwith comprised of a transmission pipeline connected through the accommodation space in the thermo carrier in the nature to cool by absorbing the heat from the fluid flowing through the active heat balance device at comparatively higher temperature, or to heat by releasing the heat to the fluid flowing through the active heat balance device at comparatively lower temperature; so that while the active regulator is discharging the fluid with temperature delta (i.e., temperature differential) to an externally passive exchange fluid source, or while the externally passive exchange fluid source inputs the fluid with temperature delta into the active regulator, the active heat balance device provided inside the thermo carrier absorbs the heat to cool or release the heat to heat the fluid depending on the relative difference of temperature between the fluid passing through and the active heat balance device thus to complete the heat reclaim by heat absorption or heat release.

The heat exchange fluid system with a thermo carrier in the nature of the present invention may be comprised of any of the following systems depending on considerations of environment, benefits and cost:

(1) a heat exchange fluid system in direct transmission mode through a one-way flowing passage;

(2) a heat exchange fluid system in indirect transmission mode through a one-way flowing passage;

(3) a heat exchange fluid system in direct transmission mode through a two-way flowing passage;

(4) a heat exchange fluid system in indirect transmission mode through two one-way flowing passage.

Figure 1:
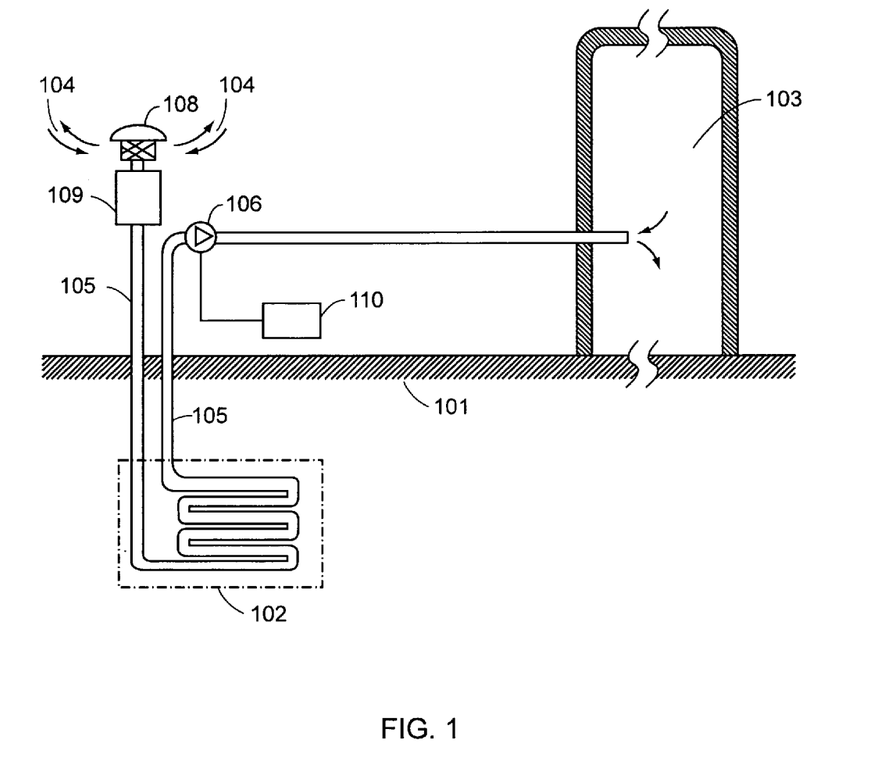
FIG. 1 is a schematic view showing a fluid exchange system for heat reclaim operating in direct transmission mode through one-way flowing passage.

Referring to FIG. 1 for a schematic view showing a fluid exchange system for heat reclaim, the system operating in direct transmission mode through one-way flowing passage is essentially comprised of:

a natural thermo carrier 101: relates to a solid or liquid thermo carrier in the nature that is provided with a comparatively larger and more stable thermo carrying capacity including stratum, geodetic surface, pond, lake, river, desert, iceberg, or ocean;

an active heat balance device 102: comprised of material with good heat conduction property and good heat conduction status with the thermo carrier 101, or the space inside the thermo-carrier 101 for the fluid to flow forthwith constituting the function of active heat balance to replace the active heat balance device made of material with good heat conduction property;

an active regulator 103: comprised of a space or structure with a specific function to be subject to pumping by a primary pump 106 during the system operation to directly export internal fluid and import external fluid through the active heat balance device 102 to execute fluid exchange for heat reclaim;

an external source of passive exchange fluid 104: relates to a natural or artificial gaseous or liquid fluid source of the nature to be subject to pumping by the primary pump 106 to provide external fluid to flow through the active heat balance device 102 into the active regulator 103; or to receive and dilute the fluid discharged by the active regulator 103;

a transmission pipeline 105: comprised of one or more than one pipelines to introduce external fluid or discharge internal fluid, a good insulation structure 107 being provided between the transmission pipeline 105 and the natural thermo carrier 101 contacted by the transmission pipeline 106, or the transmission pipeline being made of good insulation material;

the primary pump 106: comprised of a fluid pump driven by electricity or mechanical power;

a filtration device 108: an optional item comprised of strainer and hazardous fluid filtration element, installed at the fluid inlet or outlet to prevent the pipeline from blocking and to clean the pipeline, a humidity regulation device or humidity disposal structure 109: an optional item comprised of a humidity detection device or a set of discharge pumps, or a humidity or water accumulation disposal structure that is provided with discharge hole way; and a control unit 110: comprised of a dynamo-electric or a solid-state electronic circuit and related software to control fluid temperature, volume and humidity including control of fluid volume, valve control and monitor of fluid temperature, control of fluid pumps and safety protection control, detection of hazardous fluid at the import side or each export outlet, triggering off the alarm to cut off the fluid or provide other reaction in the presence of hazardous fluid at a lever challenging the preset value;

In a system configuration featuring that:

at least one transmission pipeline 105 being provided to penetrate through the one-way flowing passage for fluid transmission including the active regulator 103, the active heat balance device 102, the primary pump 106, and the external source of passive exchange fluid 104;

at lease one primary pump 106 or an optional divided circuit pump 206 being provided; wherein, the primary pump 106 engaging in cyclic operation to pump the fluid both in positive and negative direction to periodically exchange pumping the flowing direction for the fluid passing through the active heat balance device 102 including the pumping of the internal fluid of the active regular 103 to pass through the transmission pipeline 105 into the active heat balance device 102 provided inside the natural thermo carrier 101, then further through the transmission pipeline 105 and the humidity regulating device or the humidity disposal structure 109 and the filtration device 108 to be delivered to the external source of passive exchange fluid 104 or any other specific space or structure; or the pumping of the external fluid from the external source of passive exchange fluid 104 to pass through the filtration device 108 and the humidity regulation device or the humidity disposal structure 109, and the transmission pipeline 105 into the active heat balance device 102 provided in the natural thermo carrier 101, then through the transmission pipeline 105 to be delivered to the active regulator 103 for the active heat balance device 102 to indicate the cyclic change of heat absorption for cooling purpose and heat release for heating purpose on the fluid flowing through depending on the temperature delta.

Figure 2:
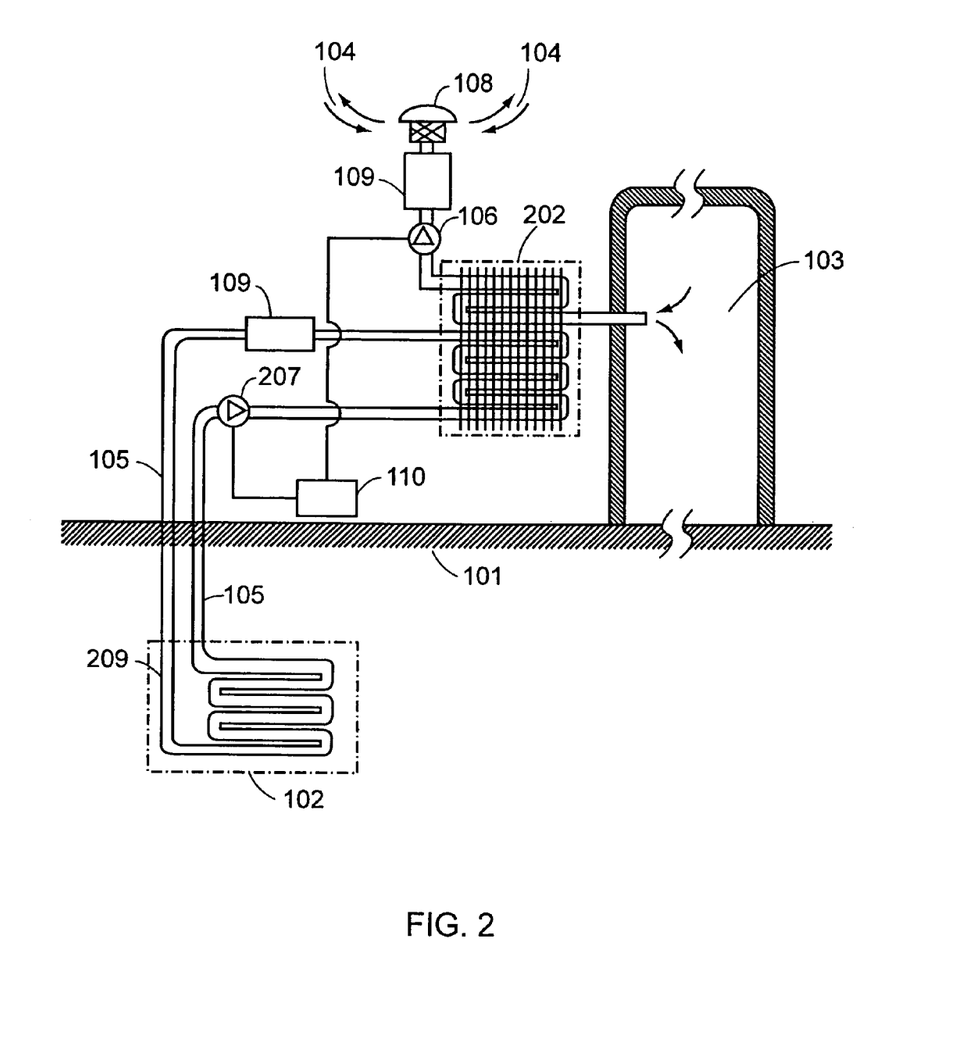
FIG. 2 is a schematic view showing a fluid exchange system for heat reclaim operating in indirect transmission mode through one-way flowing passage.

FIG. 2 is a schematic view showing a fluid exchange system for heat reclaim operating in indirect transmission mode through one-way flowing passage. Wherein, the active heat balance device 102 is provided to indirectly transmit thermal energy to one or multiple sets of relay heat balancer 202 to constitute the fluid exchange system for heat reclaim operating in indirect transmission mode through one-way flowing passage essentially comprised of:

at lease one active heat balance device 102 with good heat conduction property being provided in the natural thermo carrier 101 to actively execute heat transmission with the natural thermo carrier 101;

at lease one relay heat balancer 202 made of good thermo reservation and conduction material, at lease one transmission pipeline 105 being provided at where between the active heat balance device 102 and the relay heat balancer 202 to transmit a heat conduction fluid 209 pumped by an auxiliary pump 207 for bringing the temperature of the relay heat balancer 202 and that of the active heat balance device 102 to close to each other; and at least one unit of another transmission pipeline 105, the filtration device 108, the humidity regulation device or the humidity disposal structure 109, and the primary pump 106 for the primary pump 106 to transmit the fluid flowing between the active regulator 103 and the external source of passive exchange fluid 104; the fluids respectively flowing through both of the transmission pipelines 105 also flowing through the relay heat balancer 202 to balance the temperature delta between both fluids;

the heat conduction fluid 209: comprised of a gas or a liquid with good heat reservation and conduction properties, to be pumped by the auxiliary pump 207 to flow through a flowing passage defined by the humidity regulation device or the humidity disposal structure 109, and the transmission pipeline 105 for both of the active heat balance device 102 and the relay heat balancer to provide their functions of heat transmission;

the primary pump 106: comprised of a fluid pump driven by electricity or mechanical power;

the auxiliary pump 207: comprised of a fluid pump driven by electricity or mechanical power;

the temperature balance system between the active heat balance device 102 and the relay heat balancer 202 including:

(1) a closed loop flowing passage including at least one transmission pipeline 105, at least one fluid auxiliary pump 207, and the optional divided circuit pump 206 being provided between at least one active heat balance device 102 and at least one relay heat balancer 202 to pump the heat conduction fluid 209 with good heat conduction to execute cyclic pumping, so to provide the function of heat balance between the active heat balance device 102 and the relay heat balancer 202; or (2) a thermo pipe device with good heat conduction property being directly used to balance the temperature differential between the active heat balance device 102 and the relay heat balancer 202 by skipping the divided circuit pump; or (3) an open circuit flowing passage comprised of at least one transmission pipeline 105 and at least one primary fluid pump 106 being provided between at least one active heat balance device 102 and at least one relay heat balancer 202 to pump the heat conduction fluid 209 with good heat conduction property to balance the temperature delta between the active heat balance device 102 and the relay heat balancer 202 in one-way pump of open mode; and the fluid transmission pipeline 105 being provided on the relay balancer to connect through the active regulator 103 and the external source of passive exchange fluid 104, wherein, the primary pump 106 engaging in cyclic operation to pump the fluid both in positive and negative direction so that the flowing direction of the internal fluid pumped by the active regulator 103 to the external source of passive exchange fluid 104, or the flowing direction of the external fluid pumped by the external source of passive exchange fluid 104 to the active regulator 103 that flowing through the relay heat balancer to indicate periodical exchange, thus for the relay heat balancer 202 to indicate cyclic change of heat absorption for cooling purpose of heat release for heating purpose depending on the temperature delta of the fluid flowing through the relay heat balancer 202, and finally to constitute the fluid exchange system for heat reclaim by indirectly taking advantage of a natural thermo carrier.

Figure 3:
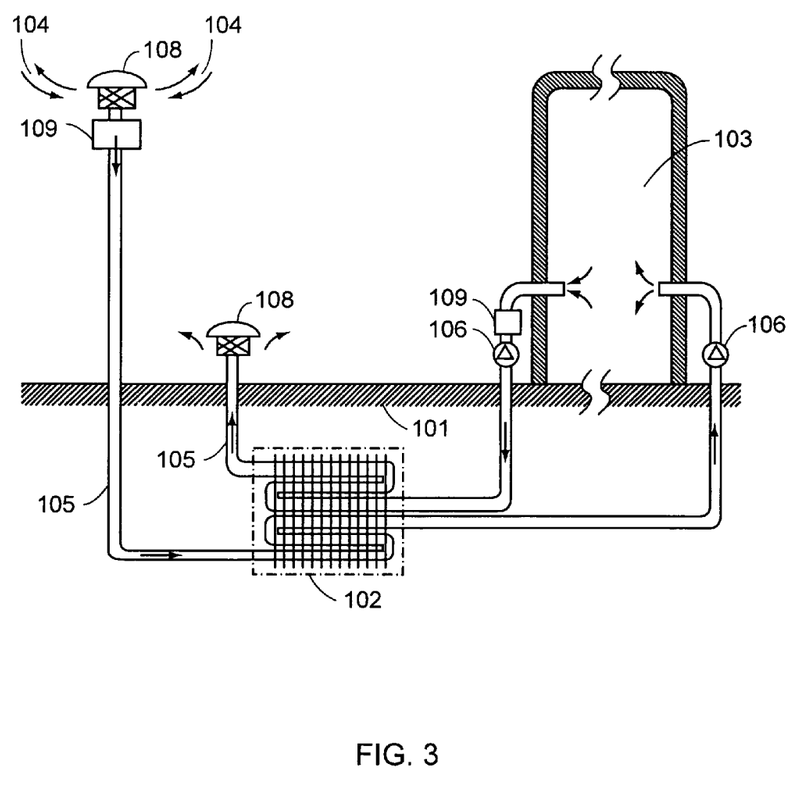
FIG. 3 is a schematic view showing a fluid exchange system for heat reclaim operating in direct transmission mode through two-way flowing passage.

FIG. 3 is a schematic view showing a fluid exchange system for heat reclaim operating in direct transmission mode through two-way flowing passage, wherein, the system is essentially comprised of:

a natural thermo carrier 101: relates to a solid or liquid thermo carrier in the nature that is provided with a comparatively larger and more stable thermo carrying capacity including stratum, geodetic surface, pond, lake, river, desert, iceberg, or ocean; and two independent transmission pipelines 105 being respectively between the active regulator 103 and the external source of passive exchange fluid 104 for the fluid to respectively and independently flow to the active heat balance device 102 provided inside the natural thermo carrier 101; within, one flowing passage being provided for the primary pump 106 to pump the internal fluid of the active regulator 103 to flow through the humidity regulation device or the humidity disposal structure 109 and the active heat balance device 102, then through the filtration device 108 to be discharged to the external source of passive exchange fluid 104 or any other space or structure with specific function; another flowing passage being provided for the primary pump 106 to pump the fluid of the external source of passive exchange fluid 104 to flow through the filtration device 108 and the humidity regulation device or the humidity disposal structure 109, the through the active heat balance device 102 to be delivered to the active regulator 103; both independent flowing passages being each provided with the primary pump 106 that operates independently to respectively and simultaneously pump in different directions the fluid independently flowing through the respective fluid transmission pipeline 105.

Figure 4:
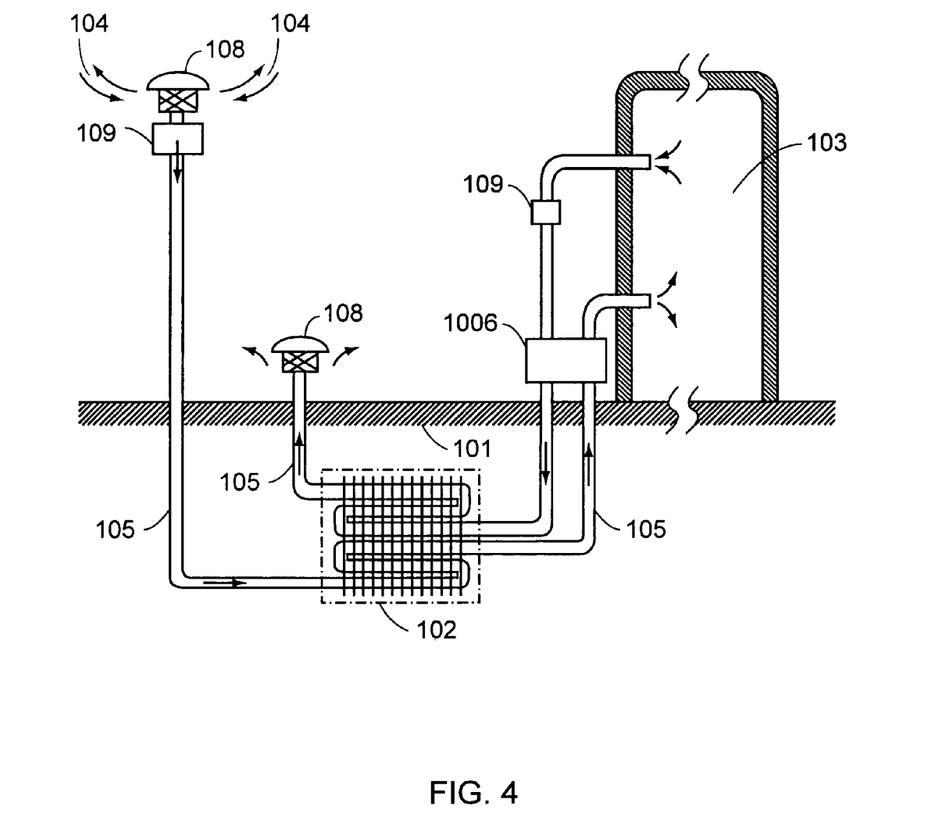
FIG. 4 is a view showing an individual primary pump illustrated in FIG. 3 is replaced by a common set of two-way primary pumps.

FIG. 4 is a view showing an individual primary pump illustrated in FIG. 3 is replaced by a common set of two-way primary pumps characterized by that:

an integrated two-way primary pump set 1006 to simultaneously pump in different directions the fluids independently flowing through the respective fluid transmission pipeline 105, and the integrated two-way primary pump set 1006 is capable of alternatively changing in cycle the direction to pump the fluid; and the active heat balance device 102 respectively provided in two independently provided transmission pipelines 105 may share the integrated structure, or separately provided or provided next to each other inside the natural thermo carrier 101.

Figure 5:
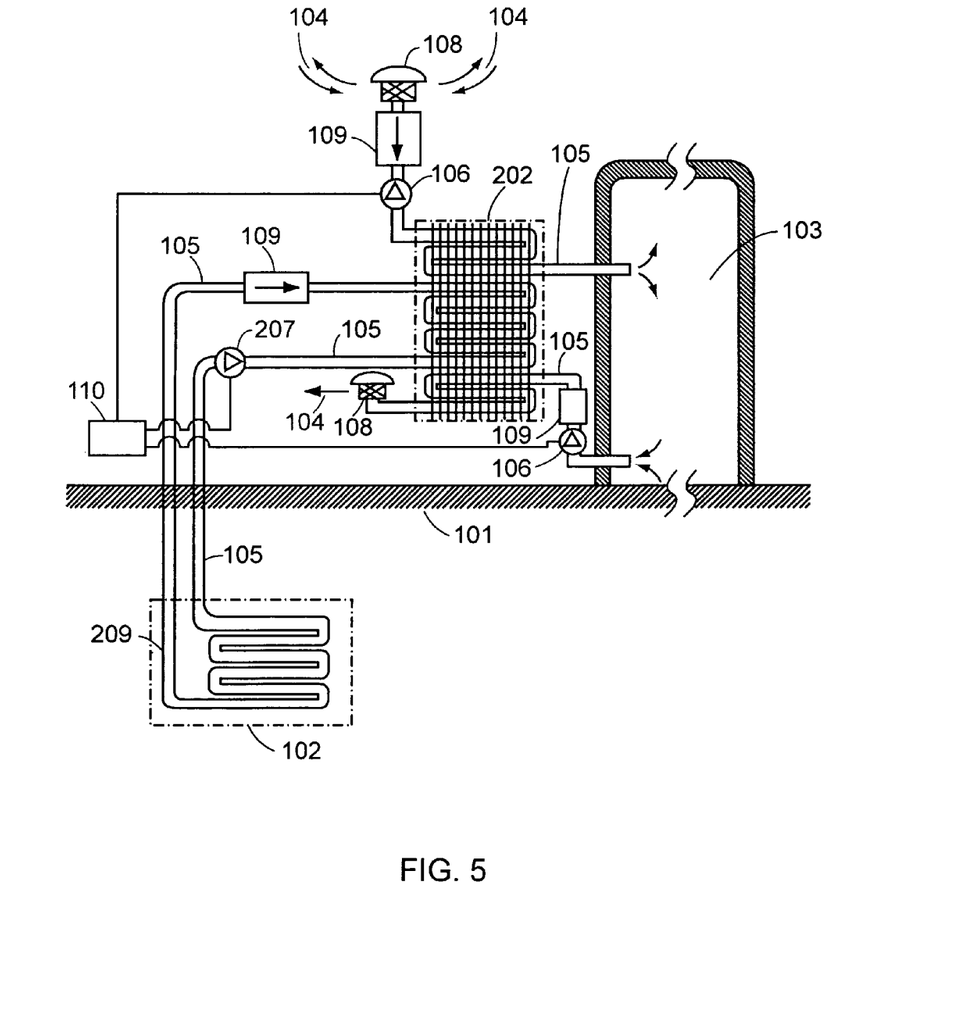
FIG. 5 is a schematic view showing a fluid exchange system for heat reclaim operating in indirect transmission mode through two-way flowing passage.

FIG. 5 is a schematic view showing a fluid exchange system for heat reclaim operating in indirect transmission mode through two-way flowing passage essentially comprised of:

a natural thermo carrier 101: relates to a solid or liquid thermo carrier in the nature that is provided with a comparatively larger and more stable thermo carrying capacity including stratum, geodetic surface, pond, lake, river, desert, iceberg, or ocean;

at least one active heat balance device 102 made of a material with good heat conduction provided inside the natural thermo carrier 101 for both of the active heat balance device 102 and the natural thermo carrier 101 to provide the heat balance transmission function; and the relay heat balancer 202: comprised of at lease one relay heat balancer 202 made of a material with good heat conduction, and at least one transmission pipeline 105 being provided to the relay heat balancer 202 to constitute a flowing passage with the active heat balance device 102 for the heat conduction fluid 209 pumped by the auxiliary pump 207 to flow through; at least one transmission pipeline 105 being provided to this system for transmitting the fluid from the external source of passive exchange fluid 104 pumped by the primary pump 106 to flow to the active regulator 103 via the relay heat balancer 202; and at least one transmission pipeline 105 for transmitting the fluid in the active regulator body pumped by the primary pump 106 to be discharged to the external source of passive exchange fluid via the relay heat balancer 202, or to any other space or structure with specific function; fluids respectively flowing through those three transmission pipelines transmitting thermal energy one another by means of the relay heat balancer 202 to constitute the exchange system for heat reclaim in directly through the natural thermo carrier 101.

The methods of heat balance between the active heat balance device 102 and the relay heat balancer 202 illustrated in FIGS. 2 and 5 and related description include:

(1) a closed loop flowing passage comprised of at least one transmission pipeline 105, at least one primary fluid pump 106 and an optional divided pump 206 to pump the heat conduction fluid 209 with good conduction property to engage in cyclic pumping, thus to provide the heat balance function between the active heat device 102 and the relay heat balancer 202; or (2) a thermal pipe device 300 with good heat conduction property is used instead to directly balance the temperature delta between the active heat balance device 102 and the relay heat balancer 202 by skipping the primary fluid pump 106 or the divided pump 206; or (3) at least one transmission pipeline 105 and at least one auxiliary pump 207 being provided between at least one active heat balance device and at least one relay heat balancer 202 to pump the heat conduction fluid 209 with good heat conduction property to constitute an open flowing passage for open one-way pumping in balancing the temperature delta between the active heat balance device 102 and the relay heat balancer 202; or (4) a transmission pipeline 105 to allow the heat conduction fluid 209 flowing through and an auxiliary pump 207 being provided between at least one relay heat balancer 202 and at least one active heat balance device 102 for the auxiliary pump 202 that pumps the heat conduction fluid 209 to execute one way pumping or cyclic pumping in alternative direction periodically to balance the temperature delta between the relay balancer 202 and the active heat balance device 102.

Fluids flowing through two independent transmission pipelines 105 provided between the active regulator 103 and the external source of passive exchange fluid 104 as illustrated in FIGS. 3, 4 and 5 and related description are respectively pumped and independently flowing to the active heat balance device 102 or the relay heat balancer 202 and its individual pumping methods include:

(1) multiple primary pumps individually operating and provided to simultaneously pump in different directions the fluids respectively flowing through independent transmission pipelines 105; or (2) at least one integrated two-way primary pump 1006 to simultaneously pump in different directions the fluids respectively flowing through independent transmission pipelines 105, and the primary 106 to further periodically change the direction of the fluid it is pumping.

The transmission pipeline 105 as illustrated in FIGS. 1, 2, 3, 4 or 5 and related description is comprised of a material with good thermal reservation property in a specific form and sufficient length to be buried in the natural thermo carrier 101 to respect the active heat balance device 102 in providing the function of heat balance.

The alternatively changed flowing direction in periodically in cycle of the fluid as illustrated in FIGS. 1, 2, 3, 4 or 5 and related description is further provided for one-way pumping by the same primary pump 106 and a pipeline flow valve 400 is provided to control the alternative change of the flowing direction of the fluid pumped by the primary pump 106, or multiple pumps operating to pump the fluids in different directions are used to execute the alternative change of the flowing direction of the fluid pumped by them.

The fluid exchange system of a natural thermo carrier for heat reclaim as illustrated in FIG. 1, 2, 3, 4 or 5 is further provided with the following auxiliary control devices as applicable including:

- a flow meter: an optional item to count the accumulated flow volume;
- a filtration device: an optional item comprised of strainer and hazardous fluid filtration element, installed at the fluid inlet or outlet to prevent the pipeline from blocking and to clean the pipeline,
- a flow regulation valve: an optional item to control by manual or by mechanical powers the volume of the fluid to be released
- a humidity regulation device or humidity disposal structure: an optional item comprised of a humidity detection device or a set of discharge pumps, or a humidity or water accumulation disposal structure that is provided with discharge hole way; and
- a control unit: comprised of a dynamo-electric or a solid-state electronic circuit and related software to control fluid temperature, volume and humidity including control of fluid volume, valve control and monitor of fluid temperature, control of fluid pumps and safety protection control, detection of hazardous fluid at the import side or each export outlet, triggering off the alarm to cut off the fluid or provide other reaction in the presence of hazardous fluid at a lever challenging the preset value.

The fluid illustrated in FIG. 1, 2, 3, 4 or 5 and related description includes gas or liquid.

Either or both of the active regulator 103 and the external source of passive exchange fluid 104 as illustrated in FIG. 1, 2, 3, 4 or 5 and related description is or are comprised of the following spaces or structures with specific function:

(1) an air conditioning object within a fixed building, e.g., a building, greenhouse, or public building;
(2) a space demanding air conditioning in a structure moving on a flowing natural thermo carrier, e.g., a sea vessel, floating working platform, or a building on surface; or
(3) an open space accommodating gas or liquid, e.g., a pond, valley, basin, or desert; or
(4) a closed container for gas or liquid, e.g., air tank or liquid container; or
(5) any manufacturing or processing equipment; or
(6) any mechanical equipment or home electric appliances that requires passive prevention of freezing or active defrosting; or
(7) any open road or airfield runway or surface navigation way that requires passive prevention of freezing or active defrosting; or
(8) any surface and deeper layer provided with temperature delta in a water way of sea port, lake, or river; or
(9) any site with specific geologic features, e.g., a desert and it surrounding environment.

A fluid exchange system of a natural thermo carrier for heat reclaim of the present invention by taking advantage of a natural thermo carrier as a stable object to absorb and release heat to execute fluid exchange between an active regulator and an external source of passive exchange fluid, thus to execute the heat reclaim by absorbing the heat from the fluid of comparatively higher temperature for cooling purpose and by releasing the heat to the fluid of comparatively lower temperature for heating purpose by having the fluid flowing through an active heat balance device provided inside the natural thermo carrier or through a relay heat balancer provided to the active heat balance device to engage in transmission of heat between each other for heat balance purpose, is innovative and provided with specific functions. Therefore, this application for a patent is duly filed.

What is claimed is:

1. A fluid exchange system of a natural thermo carrier for heat reclaim is to provide an active heat balance device that gives good heat conduction property in a comparatively stable solid or liquid state thermo carrier in the nature including stratum, geodetic surface, pond, lake or river, comprising:

an active regulator comprising an accommodation space;

an active heat balance device comprised of a transmission pipeline connected to the accommodation space to cool the accommodation space by absorbing heat from the fluid flowing through the active heat balance device to the active regulator at comparatively higher temperature, or to heat the accommodation space by releasing heat to the fluid flowing through the active heat balance device from the active regulator at comparatively lower temperature; so that while the active regulator is discharging the fluid with temperature differential to an externally passive exchange fluid source, or while the externally passive exchange fluid source inputs the fluid with temperature differential into the active regulator, the active heat balance device absorbs the heat to cool or release the heat to heat the fluid depending on the relative difference of temperature between the fluid passing through and the active heat balance device thus to complete the heat reclaim by heat absorption or heat release in a system configuration including at least one of the following systems:

(1) a heat exchange fluid system in direct transmission mode through a one-way flowing passage;
(2) a heat exchange fluid system in indirect transmission mode through a one-way flowing passage;
(3) a heat exchange fluid system in direct transmission mode through a two-way flowing passage; or
(4) a heat exchange fluid system in indirect transmission mode through two one-way flowing passages.

2. A fluid exchange system of a natural thermo carrier for heat reclaim as claimed in claim 1, wherein, the heat exchange fluid system in direct transmission mode through a one-way flowing passage is essentially comprised of:

a natural thermo carrier 101: relates to a solid or liquid thermo carrier in the nature that is provided with a comparatively larger and more stable thermo carrying capacity including stratum, geodetic surface, pond, lake, river, desert, iceberg, or ocean;

an active heat balance device 102: comprised of material with good heat conduction property and good heat conduction status with the thermo carrier 101, or the space inside the thermo-carrier 101 for the fluid to flow forthwith constituting the function of active heat balance to replace the active heat balance device made of material with good heat conduction property;

active regulator 103: comprised of a space or structure with a specific function to be subject to pumping by a primary pump 106 during the system operation to directly export internal fluid and import external fluid through the active heat balance device 102 to execute fluid exchange for heat reclaim;

an external source of passive exchange fluid 104: relates to a natural or artificial gaseous or liquid fluid source of the nature to be subject to pumping by the primary pump 106 to provide external fluid to flow through the active heat balance device 102 into the active regulator 103; or to receive and dilute the fluid discharged by the active regulator 103;

a transmission pipeline 105: comprised of one or more than one pipelines to introduce external fluid or discharge internal fluid, a good insulation structure being provided between the transmission pipeline 105 and the natural thermo carrier 101 contacted by the transmission pipeline 106, or the transmission pipeline being made of good insulation material;

the primary pump 106: comprised of a fluid pump driven by electricity or mechanical power;

a filtration device 108: an optional item comprised of strainer and hazardous fluid filtration element, installed at the fluid inlet or outlet to prevent the pipeline from blocking and to clean the pipeline, a humidity regulation device or humidity disposal structure 109: an optional item comprised of a humidity detection device or a set of discharge pumps, or a humidity or water accumulation disposal structure that is provided with discharge hole way; and a control unit 110: comprised of a dynamo-electric or a solid-state electronic circuit and related software to control fluid temperature, volume and humidity including control of fluid volume, valve control and monitor of fluid temperature, control of fluid pumps and safety protection control, detection of hazardous fluid at the import side or each export outlet, triggering off the alarm to cut off the fluid or provide other reaction in the presence of hazardous fluid at a lever challenging the preset value; in a system configuration featuring that:

at least one transmission pipeline 105 being provided to penetrate through the one-way flowing passage for fluid transmission including the active regulator 103, the active heat balance device 102, the primary pump 106, and the external source of passive exchange fluid 104;

at lease one primary pump 106 or an optional divided circuit pump 206 being provided; wherein, the primary pump 106 engaging in cyclic operation to pump the fluid both in positive and negative direction to periodically exchange pumping the flowing direction for the fluid passing through the active heat balance device 102 including the pumping of the internal fluid of the active regular 103 to pass through the transmission pipeline 105 into the active heat balance device 102 provided inside the natural thermo carrier 101, then further through the transmission pipeline 105 and the humidity regulating device or the humidity disposal structure 109 and the filtration device 108 to be delivered to the external source of passive exchange fluid 104 or any other specific space or structure; or the pumping of the external fluid from the external source of passive exchange fluid 104 to pass through the filtration device 108 and the humidity regulation device or the humidity disposal structure 109, and the transmission pipeline 105 into the active heat balance device 102 provided in the natural thermo carrier 101, then through the transmission pipeline 105 to be delivered to the active regulator 103 for the active heat balance device 102 to indicate the cyclic change of heat absorption for cooling purpose and heat release for heating purpose on the fluid flowing through depending on the temperature differential.

3. A fluid exchange system of a natural thermo carrier for heat reclaim as claimed in claim 1, wherein, the active heat balance device 102 is provided to indirectly transmit thermal energy to one or multiple sets of relay heat balancer 202 to constitute the fluid exchange system for heat reclaim operating in indirect transmission mode through one-way flowing passage essentially comprised of:

at lease one active heat balance device 102 with good heat conduction property being provided in the natural thermo carrier 101 to actively execute heat transmission with the natural thermo carrier 101;

at lease one relay heat balancer 202 made of good thermo reservation and conduction material, at lease one transmission pipeline 105 being provided at where between the active heat balance device 102 and the relay heat balancer 202 to transmit a heat conduction fluid 209 pumped by an auxiliary pump 207 for bringing the temperature of the relay heat balancer 202 and that of the active heat balance device 102 to close to each other; and at least one unit of another transmission pipeline 105, the filtration device 108, the humidity regulation device or the humidity disposal structure 109, and the primary pump 106 for the primary pump 106 to transmit the fluid flowing between the active regulator 103 and the external source of passive exchange fluid 104; the fluids respectively flowing through both of the transmission pipelines 105 also flowing through the relay heat balancer 202 to balance the temperature differential between both fluids;

the heat conduction fluid 209: comprised of a gas or a liquid with good heat reservation and conduction properties, to be pumped by the auxiliary pump 207 to flow through a flowing passage defined by the humidity regulation device or the humidity disposal structure 109, and the transmission pipeline 105 for both of the active heat balance device 102 and the relay heat balancer to provide their functions of heat transmission;

the primary pump 106: comprised of a fluid pump driven by electricity or mechanical power;

the auxiliary pump 207: comprised of a fluid pump driven by electricity or mechanical power;

the temperature balance system between the active heat balance device 102 and the relay heat balancer 202 including:

(1) a closed loop flowing passage including at least one transmission pipeline 105, at least one fluid auxiliary pump 207, and the optional divided circuit pump being provided between at least one active heat balance device 102 and at least one relay heat balancer 202 to pump the heat conduction fluid 209 with good heat conduction to execute cyclic pumping, so to provide the function of heat balance between the active heat balance device 102 and the relay heat balancer 202; or (2) a thermo pipe device with good heat conduction property being directly used to balance the temperature differential between the active heat balance device 102 and the relay heat balancer 202 by skipping the divided circuit pump; or (3) an open circuit flowing passage comprised of at least one transmission pipeline 105 and at least one primary fluid pump 106 being provided between at least one active heat balance device 102 and at least one relay heat balancer 202 to pump the heat conduction fluid 209 with good heat conduction property to balance the temperature differential between the active heat balance device 102 and the relay heat balancer 202 in one-way pump of open mode; and the fluid transmission pipeline 105 being provided on the relay balancer to connect through the active regulator 103 and the external source of passive exchange fluid 104, wherein, the primary pump 106 engaging in cyclic operation to pump the fluid both in positive and negative direction so that the flowing direction of the internal fluid pumped by the active regulator 103 to the external source of passive exchange fluid 104, or the flowing direction of the external fluid pumped by the external source of passive exchange fluid 104 to the active regulator 103 that flowing through the relay heat balancer to indicate periodical exchange, thus for the relay heat balancer 202 to indicate cyclic change of heat absorption for cooling purpose of heat release for heating purpose depending on the temperature differential of the fluid flowing through the relay heat balancer 202, and finally to constitute the fluid exchange system for heat reclaim by indirectly taking advantage of a natural thermo carrier.

4. The fluid exchange system of a natural thermo carrier for heat reclaim as claimed in claim 1, wherein the system operates in a direct transmission mode through two-way flowing passages, the system being comprised of:

a natural thermo carrier having a large and stable thermo carrying capacity; and two independent transmission pipelines each being respectively coupled between the active regulator and the external source of passive exchange fluid for the fluid to respectively and independently flow through the active heat balance device provided inside the natural thermo carrier;

a first one of the pipelines comprising a first humidity device, a first filtration device, and a first primary pump to pump internal fluid of the active regulator to flow through the first humidity device, further comprising a first humidity regulation device or a first humidity disposal structure, and the active heat balance device, and then through the first filtration device to be discharged to the external source of passive exchange fluid;

a second one of the pipelines comprising a second humidity device, a second filtration device, and a second primary pump to pump the fluid of the external source of passive exchange fluid to flow through the second filtration device and the second humidity device, further comprising a second humidity regulation device or a second humidity disposal structure, and then through the active heat balance device to be delivered to the active regulator;

the first and second primary pumps operating independently to respectively and simultaneously pump the fluid in different directions independently flowing through the respective first and second fluid transmission pipelines, and wherein the first and second pipelines are both comprised in the active heat balance device disposed within the natural thermo carrier.

5. The fluid exchange system of a natural thermo carrier for heat reclaim as claimed in claim 4, comprising a single active regulator and a single external source of passive exchange fluid.

6. The fluid exchange system of a natural thermo carrier for heat reclaim as claimed in claim 4, wherein the passive exchange fluid is air and the external source of passive exchange fluid is the atmosphere.

7. A fluid exchange system of a natural thermo carrier for heat reclaim as claimed in claim 1, wherein, the individual primary pump in the heat reclaim exchange system of direct transmission in two-way flowing passage is replaced by a common set of two-way primary pumps characterized by that:

an integrated two-way primary pump set 1006 to simultaneously pump in different directions the fluids independently flowing through the respective fluid transmission pipeline 105, and the integrated two-way primary pump set 1006 is capable of alternatively changing in cycle the direction to pump the fluid; and the active heat balance device 102 respectively provided in two independently provided transmission pipelines 105 may share the integrated structure, or separately provided or provided next to each other inside the natural thermo carrier 101.

8. A fluid exchange system of a natural thermo carrier for heat reclaim as claimed in claim 1, wherein, the heat reclaim exchange system of indirect transmission in two-way flowing passage is essentially comprised of:

a natural thermo carrier 101: relates to a solid or liquid thermo carrier in the nature that is provided with a comparatively larger and more stable thermo carrying capacity including stratum, geodetic surface, pond, lake, river, desert, iceberg, or ocean;

at least one active heat balance device 102 made of a material with good heat conduction provided inside the natural thermo carrier 101 for both of the active heat balance device 102 and the natural thermo carrier 101 to provide the heat balance transmission function; and the relay heat balancer 202: comprised of at lease one relay heat balancer 202 made of a material with good heat conduction, and at least one transmission pipeline 105 being provided to the relay heat balancer 202 to constitute a flowing passage with the active heat balance device 102 for the heat conduction fluid 209 pumped by the auxiliary pump 207 to flow through; at least one transmission pipeline 105 being provided to this system for transmitting the fluid from the external source of passive exchange fluid 104 pumped by the primary pump 106 to flow to the active regulator 103 via the relay heat balancer 202; and at least one transmission pipeline 105 for transmitting the fluid in the active regulator body pumped by the primary pump 106 to be discharged to the external source of passive exchange fluid via the relay heat balancer 202, or to any other space or structure with specific function; fluids respectively flowing through those three transmission pipelines transmitting thermal energy one another by means of the relay heat balancer 202 to constitute the exchange system for heat reclaim indirectly through the natural thermo carrier 101.

9. A fluid exchange system of a natural thermo carrier for heat reclaim as claimed in claim 1, 3, or 8 wherein, the methods of heat balance between the active heat balance device 102 and the relay heat balancer 202 include:
  (1) a closed loop flowing passage comprised of at least one transmission pipeline 105, at least one primary fluid pump 106 and an optional divided pump 206 to pump the heat conduction fluid 209 with good conduction property to engage in cyclic pumping, thus to provide the heat balance function between the active heat device 102 and the relay heat balancer 202; or
  (2) a thermal pipe device 300 with good heat conduction property is used instead to directly balance the temperature differential between the active heat balance device 102 and the relay heat balancer 202 by skipping the primary fluid pump 106 or the divided pump 206; or
  (3) at least one transmission pipeline 105 and at least one auxiliary pump 207 being provided between at least one active heat balance device and at least one relay heat balancer 202 to pump the heat conduction fluid 209 with good heat conduction property to constitute an open flowing passage for open one-way pumping in balancing the temperature differential between the active heat balance device 102 and the relay heat balancer 202; or
  (4) a transmission pipeline 105 to allow the heat conduction fluid 209 flowing through and an auxiliary pump 207 being provided between at least one relay heat balancer 202 and at least one active heat balance device 102 for the auxiliary pump 202 that pumps the heat conduction fluid 209 to execute one way pumping or cyclic pumping in alternative direction periodically to balance the temperature differential between the relay balancer 202 and the active heat balance device 102.

10. A fluid exchange system of a natural thermo carrier for heat reclaim as claimed in claim 1, 4, 7 or 8, wherein, fluids flowing through two independent transmission pipelines 105 provided between the active regulator 103 and the external source of passive exchange fluid 104 are respectively pumped and independently flowing to the active heat balance device 102 or the relay heat balancer 202 and its individual pumping methods include:
  (1) multiple primary pumps individually operating and provided to simultaneously pump in different directions the fluids respectively flowing through independent transmission pipelines 105; or
  (2) at least one integrated two-way primary pump 1006 to simultaneously pump in different directions the fluids respectively flowing through independent transmission pipelines 105, and the primary 106 to further periodically change the direction of the fluid it is pumping.

11. A fluid exchange system of a natural thermo carrier for heat reclaim as claimed in claim 1, wherein, the transmission pipeline 105 is comprised of a material with good thermal reservation property in a specific form and sufficient length to be buried in the natural thermo carrier 101 to respect the active heat balance device 102 in providing the function of heat balance.

12. A fluid exchange system of a natural thermo carrier for heat reclaim as claimed in claim 1, wherein, the alternatively changed flowing direction in periodically in cycle of the fluid is further provided for one-way pumping by the same primary pump 106 and a pipeline flow valve 400 is provided to control the alternative change of the flowing direction of the fluid pumped by the primary pump 106, or multiple pumps operating to pump the fluids in different directions are used to execute the alternative change of the flowing direction of the fluid pumped by them.

13. A fluid exchange system of a natural thermo carrier for heat reclaim as claimed in claim 1, wherein, the system is further provided with the following auxiliary control devices as applicable including:
  a flow meter: an optional item to count the accumulated flow volume;
  a filtration device: an optional item comprised of strainer and hazardous fluid filtration element, installed at the fluid inlet or outlet to prevent the pipeline from blocking and to clean the pipeline,
  a flow regulation valve: an optional item to control by manual or by mechanical powers the volume of the fluid to be released
  a humidity regulation device or humidity disposal structure: an optional item comprised of a humidity detection device or a set of discharge pumps, or a humidity or water accumulation disposal structure that is provided with discharge hole way; and
  a control unit: comprised of a dynamo-electric or a solid-state electronic circuit and related software to control fluid temperature, volume and humidity including control of fluid volume, valve control and monitor of fluid temperature, control of fluid pumps and safety protection control, detection of hazardous fluid at the import side or each export outlet, triggering off the alarm to cut off the fluid or provide other reaction in the presence of hazardous fluid at a lever challenging the preset value.

14. A fluid exchange system of a natural thermo carrier for heat reclaim as claimed in claim 1, wherein, the fluid includes gas or liquid.

15. A fluid exchange system of a natural thermo carrier for heat reclaim as claimed in claim 1, wherein, either or both of the active regulator 103 and the external source of passive exchange fluid 104 is or are comprised of the following spaces or structures with specific function:
  (1) an air conditioning object within a fixed building, e.g., a building, greenhouse, or public building;
  (2) a space demanding air conditioning in a structure moving on a flowing natural thermo carrier, e.g., a sea vessel, floating working platform, or a building on surface; or
  (3) an open space accommodating gas or liquid, e.g., a pond, valley, basin, or desert; or
  (4) a closed container for gas or liquid, e.g., air tank or liquid container; or
  (5) any manufacturing or processing equipment; or
  (6) any mechanical equipment or home electric appliances that requires passive prevention of freezing or active defrosting; or
  (7) any open road or airfield runway or surface navigation way that requires passive prevention of freezing or active defrosting; or
  (8) any surface and deeper layer provided with temperature differential in a water way of sea port, lake, or river; or
  (9) any site with specific geologic features, e.g., a desert and it surrounding environment.

* * * * *